(12) United States Patent
Shtilkind et al.

(10) Patent No.: US 11,943,177 B2
(45) Date of Patent: Mar. 26, 2024

(54) VIRTUAL AGENT PORTAL INTEGRATION OF TWO FRAMEWORKS

(71) Applicant: ServiceNow, Inc., Santa Clara, CA (US)

(72) Inventors: Eugene Aaron Shtilkind, San Diego, CA (US); Munjal Angur Patel, San Diego, CA (US); Craig Campbell Brunner, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/647,575

(22) Filed: Jan. 10, 2022

(65) Prior Publication Data

US 2022/0131816 A1    Apr. 28, 2022

Related U.S. Application Data

(63) Continuation of application No. 16/357,988, filed on Mar. 19, 2019, now Pat. No. 11,223,581.

(51) Int. Cl.
| | | |
|---|---|---|
| *G06F 15/16* | (2006.01) | |
| *G06F 11/34* | (2006.01) | |
| *G06F 16/332* | (2019.01) | |
| *G06F 40/205* | (2020.01) | |
| *H04L 51/02* | (2022.01) | |

(52) U.S. Cl.
CPC .......... *H04L 51/02* (2013.01); *G06F 11/3438* (2013.01); *G06F 16/3329* (2019.01); *G06F 40/205* (2020.01)

(58) Field of Classification Search
CPC ... H04L 51/02; G06F 16/3329; G06F 40/205; G06F 11/3438
See application file for complete search history.

(56) References Cited

U.S. PATENT DOCUMENTS

| | | |
|---|---|---|
| 6,609,122 B1 | 8/2003 | Ensor |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |

(Continued)

*Primary Examiner* — Normin Abedin
(74) *Attorney, Agent, or Firm* — Fletcher Yoder, PC

(57) ABSTRACT

The present approach relates to systems and methods for facilitating a client-agent conversation using dynamic, contextual information related to a client portal. The contextual information for the conversation may be determined using a server side script and/or a client side script that provides relevant portal usage data. The contextual information may be used to determine a conversation topic, which may be used to facilitate routing a request to chat to the appropriate agent for the topic.

20 Claims, 7 Drawing Sheets

(56) References Cited

U.S. PATENT DOCUMENTS

| | | |
|---|---|---|
| 8,457,928 B2 | 6/2013 | Dang |
| 8,478,569 B2 | 7/2013 | Scarpelli |
| 8,674,992 B2 | 3/2014 | Poston |
| 8,689,241 B2 | 4/2014 | Naik |
| 8,743,121 B2 | 6/2014 | De Peuter |
| 8,887,133 B2 | 11/2014 | Behnia |
| 9,239,857 B2 | 1/2016 | Trinon |
| 9,535,737 B2 | 1/2017 | Joy |
| 9,557,969 B2 | 1/2017 | Sharma |
| 9,792,387 B2 | 10/2017 | George |
| 10,440,325 B1 | 10/2019 | Boxwell et al. |
| 2005/0188318 A1 | 8/2005 | Tamir et al. |
| 2008/0059446 A1 | 3/2008 | Blass et al. |
| 2013/0073389 A1 | 3/2013 | Heath |
| 2013/0275862 A1* | 10/2013 | Adra .................... H04L 51/046 |
| | | 715/234 |
| 2017/0323325 A1* | 11/2017 | Hamedi ............. H04L 67/1072 |
| 2017/0324867 A1* | 11/2017 | Tamblyn ............ H04L 65/1093 |
| 2018/0095634 A1 | 4/2018 | Alexander |
| 2018/0322439 A1 | 11/2018 | Dudani et al. |
| 2019/0251966 A1* | 8/2019 | Dharne ................... G06N 5/02 |
| 2019/0319898 A1* | 10/2019 | Scanlon ................... G06N 5/01 |

* cited by examiner

VIRTUAL AGENT PORTAL INTEGRATION OF TWO FRAMEWORKS

CROSS-REFERENCE TO RELATED APPLICATIONS

This application is a continuation of U.S. application Ser. No. 16/357,988, filed Mar. 19, 2019, now U.S. Pat. No. 11,223,581, entitled "VIRTUAL AGENT PORTAL INTEGRATION OF TWO FRAMEWORKS," the disclosure of which is incorporated by reference in its entirety for all purposes.

BACKGROUND

The present disclosure relates generally to using contextual information from a client portal to direct a chat request to an agent.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Enterprise networks, systems, and other related processes may utilize software and hardware resources, often implemented on multiple, inter-connected devices, to conduct activities or otherwise perform the activities of various enterprise operations. Some activities may include providing a client portal that allows access to enterprise applications using such resources. However, provisions, configurations, expansion, maintenance, and normal use of such resources, as well as related systems, may give rise to clients using the portal to request a conversation with an agent. By way of example, the client may view various portal pages, articles, catalogs, and the like, prior to requesting to chat with an agent.

In such instances, the chat request may be routed or assigned to a customer service agent. However, while the client may be concerned with a particular topic of conversation, such as a topic related to the client's search prior to the request, the agent may be assigned at random.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present approach relates to systems and methods for facilitating a client-agent conversation using dynamic, contextual information related to a client portal. In particular, a server side script and/or a client side script is used to provide relevant portal usage data to determine contextual information for the conversation.

The systems and methods disclosed herein determine contextual information for routing client-agent conversations in a queue of chat requests from a particular client portal. The contextual information may be determined using portal data from a server script, a client script, or both. The system and methods utilize the contextual information to determine a relevant topic of conversation and use this topic of conversation to route the conversation request to the most appropriate agent. In this manner, the system may learn to more precisely route a client-agent conversation rather than routing a conversation to any agent without context. Moreover, the contextual information may be used to automatically populate or skip initial questions typically used to begin the conversation.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
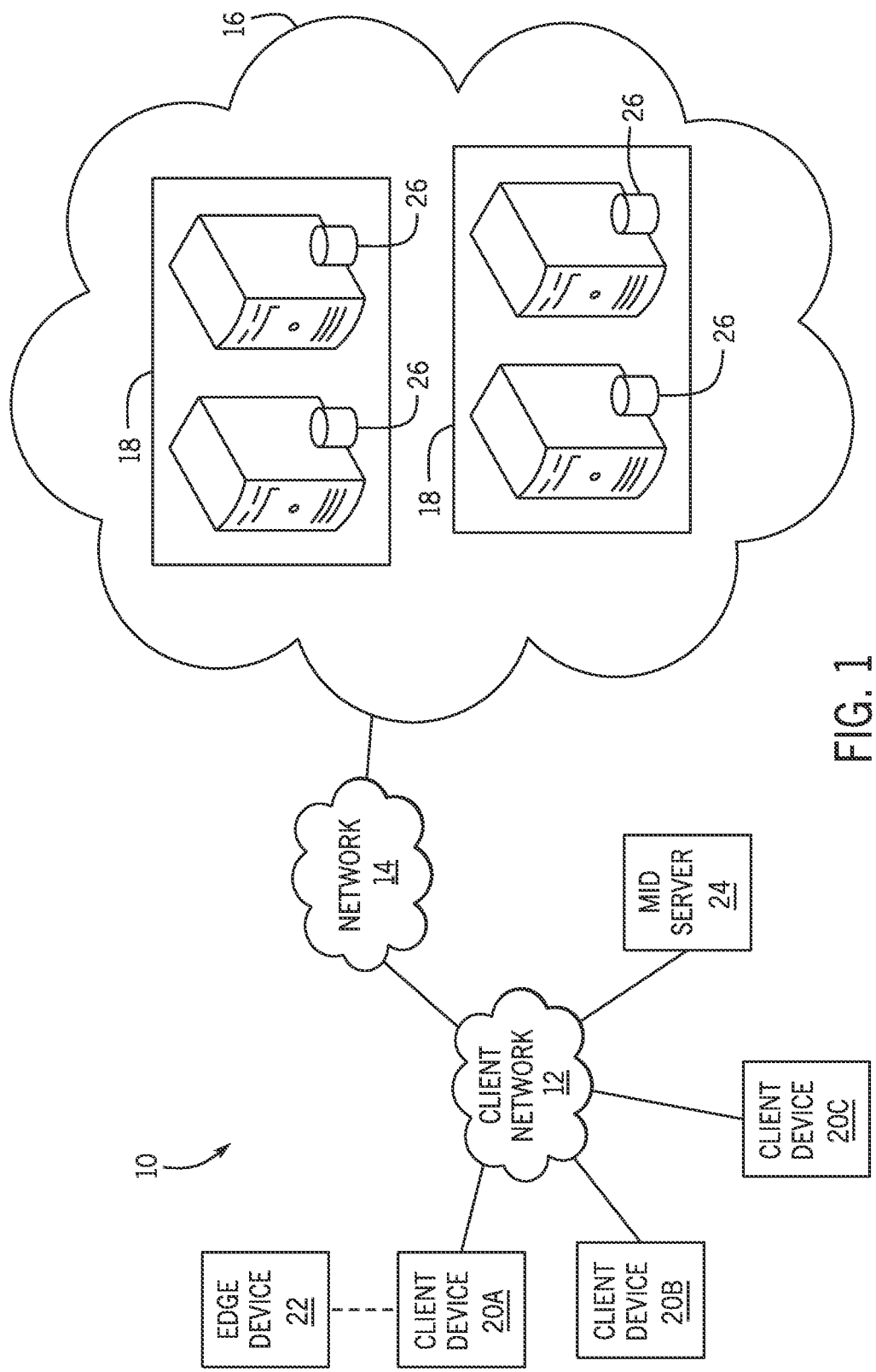
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As used herein, an "agent" refers to an administrative agent and/or a computer generated intelligent virtual agent. As used herein, the term "script" refers to a computer code implemented on a device or system within a computing network. Example embodiments include a client script and a server script. Client script refers to computer code executed in a client or local environment. Example embodiments include code executed on a portal or local application running on a client device, such as a web browser on client's computer. Server script refers to computer code executed in the service or cloud provider environment. Example embodiments include code executed by a server in the provider environment in response to a request from the client environment, such as a request to change the appearance or behavior of a portal page running on the client device. The server script may generate the requested portal page and send it to the client portal.

As discussed herein, a client using a portal to access applications in the provider environment may request to chat with an administrative agent. Once the request for the chat has been received by the provider system, the chat may typically be assigned at random. By way of example, the client may navigate through various pages and documents of the portal prior to requesting to chat with an agent. Thus, after a client may have already spent time searching for information related to a topic in the portal, the client may be asked initial conversation questions related to the same search.

Accordingly, it is now appreciated that there is a need to manage routing client-agent conversations using contextual information so as to reduce or eliminate the time used to answer initial conversation questions. However, determining the relevant information used to determine the appropriate agent may be difficult to implement in practice.

With the preceding in mind, the following figures relate to various types of generalized system architectures or configurations that may be employed to provide services to an organization in a cloud-computing framework and on which the present approaches may be employed. Correspondingly, these system and platform examples may also relate to systems and platforms on which providing contextual information relating to portal usage as discussed herein may be implemented or otherwise utilized. Turning now to FIG. 1, a schematic diagram of an embodiment of a cloud computing system 10, where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that may include one or more LANs, virtual networks, data centers 18, and/or other remote networks.

As shown in FIG. 1, the client network 12 is able to connect to one or more client devices 20A, 20B, and 20C so that the client devices 20 are able to communicate with each other and/or with the network hosting the platform 16. The client devices 20 may be computing systems and/or other types of computing devices generally referred to as Internet of Things (IoT) devices that access cloud computing services, for example, via a web browser application, a portal, or via an edge device 22 that may act as a gateway between the client devices 20 and the platform 16. In some implementations, client devices 20 using a portal to access the cloud computing services may include client scripts, such that the client script provides functionality (e.g., enabling selection of objects or a link) in the portal. Moreover, the client script may be used to track portal usage (e.g., user clicking on particular topics or buttons within the portal that is enabled by the client script) with respect to local or localized behaviors or actions on the respective device 20, which may be used to provide contextual information to the provider system (e.g., network hosting the platform 16). The contextual information may be used to optimize chat conversations using the techniques described herein.

FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

As depicted, the client network 12 may be coupled to a network 14. The network 14 may include one or more computing networks, such as other LANs, wide area networks (WAN), the Internet, and/or other remote networks, to transfer data between the client devices 20 and the network hosting the platform 16. For example, client script and/or server script data indicating portal usage may be provided to the platform 16 via the network 14, such as to provide contextual information that may be used by agents, developers, and other IT or application developing personnel.

Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprises, IT, and/or other organization-related functions. In one embodiment, the network hosting the platform 16 is implemented on the one or more data centers 18, where each data center may correspond to a different geographic location. Each of the data centers 18 includes a plurality of virtual servers 26 (also referred to herein as application nodes, application servers, virtual server instances, application instances, or application server instances), where each virtual server 26 may be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog). In some implementations, server scripts may be executed on the server (e.g., webserver or virtual servers 26) on the server side (e.g., network hosting the platform 16), to produce a customized response to a client's request in the portal. As such, the server script executing on the server may also be used to track the client's activity in the portal (e.g., server script data), indicating the pages viewed, documents downloaded, client portal settings, or functionalities enabled within the portal by the server script. Moreover, this data may be stored in a database in the provider environment, such as the server or database that may be accessed by server. The client may not have access to this database in the provider environment. The server script data may be used alone or in conjunction with the client script data to determine contextual information related to portal usage.

To utilize computing resources within the platform 16, network operators may choose to configure the data centers 18 using a variety of computing infrastructures. In one embodiment, one or more of the data centers 18 are configured using a multi-tenant cloud architecture, such that one of the server 26 instances handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture may assign a particular identifier for each customer in order to identify and segregate the data from each customer. Generally, implementing a multi-tenant cloud architecture may suffer from various drawbacks, such as a failure of a particular one of the server 26 instances causing outages for all customers allocated to the particular server instance.

In another embodiment, one or more of the data centers 18 are configured using a multi-instance cloud architecture to provide every customer its own unique customer instance or instances. For example, a multi-instance cloud architecture may provide each customer instance with its own dedicated application server and dedicated database server. In other examples, the multi-instance cloud architecture may deploy a single physical or virtual server 26 and/or other combinations of physical and/or virtual servers 26, such as one or more dedicated web servers, one or more dedicated application servers, and one or more database servers, for each customer instance.

In a multi-instance cloud architecture, multiple customer instances may be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

As discussed herein, as part of enhancing customer experience of a computer environment, such as those described above, agents may provide customer service to users via a portal chat. Once a chat has been requested, the client script and/or server script data may be used to determine contextual information related to the client's portal usage prior to requesting the chat. As will be discussed in detail in FIGS. 6-8, this data may be used to truncate the conversation, such as by automating answers for questions that may otherwise be asked routinely to start the conversation, or to improve the quality or relevance of information provided in response to an inquiry.

Figure 2:
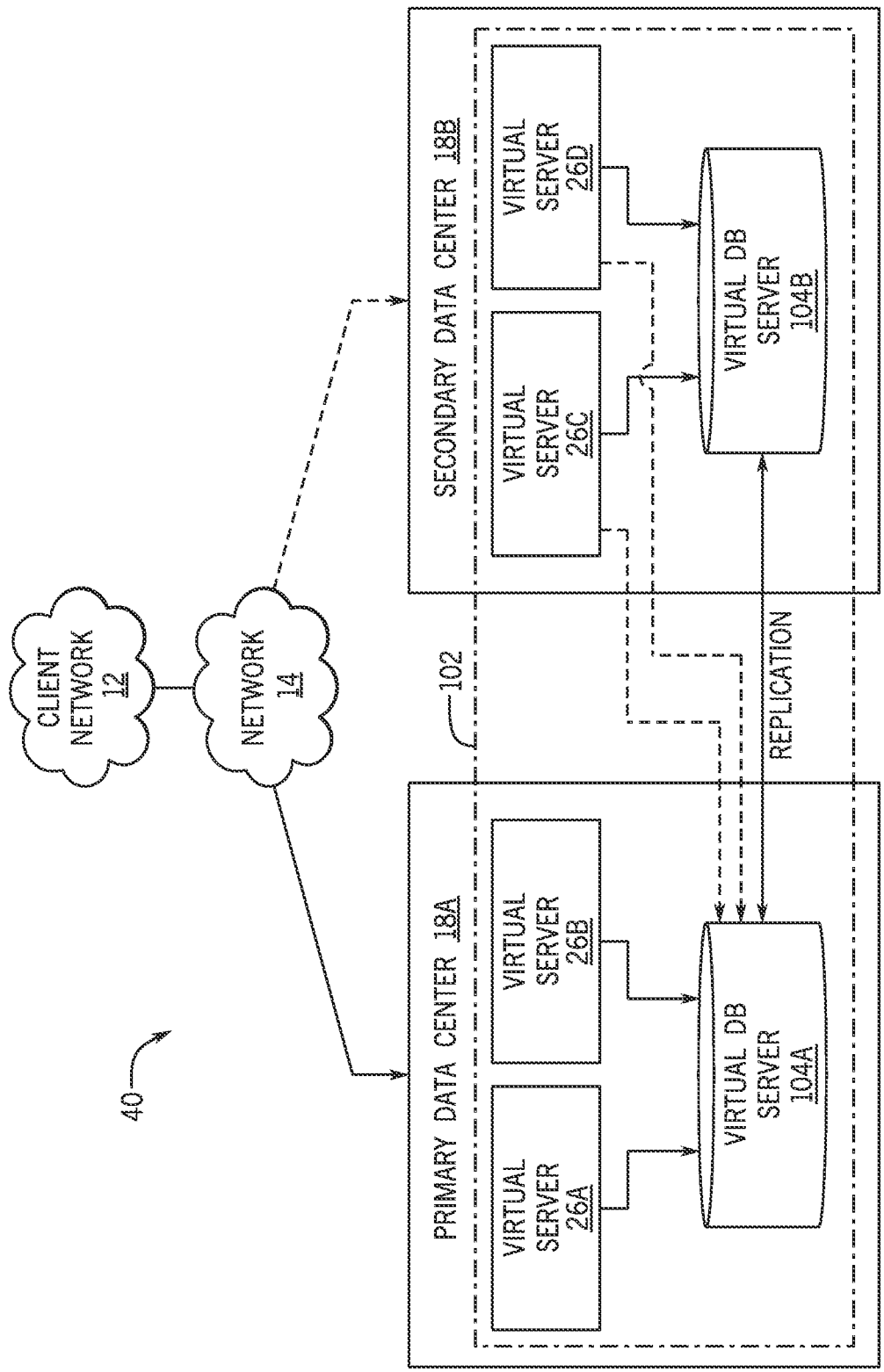
FIG. 2 is a schematic diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 40 may include other types of dedicated virtual servers, such as a web server. For example, the client instance 102 may be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and may utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
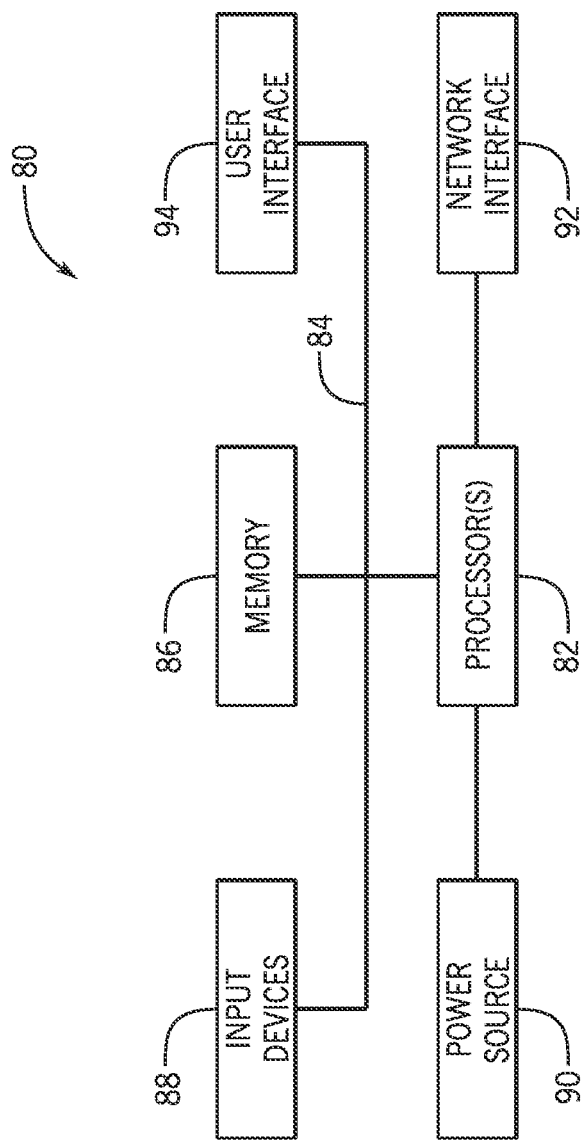
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. For example, instructions may include implementing a set of rules for determining a conversation topic using the client script data and/or server script data. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 include suitable electrical channels to provide data and/or power between the various components of the computing system 80. The memory 86 may include any tangible, non-transitory, and computer-readable storage media. Although shown as a single block in FIG. 1, the memory 86 may be implemented using multiple physical units of the same or different types in one or more physical locations. The input devices 88 correspond to structures to input data and/or commands to the one or more processors 82. For example, the input devices 88 may include a mouse, touchpad, touchscreen, keyboard and the like.

The power source 90 may be any suitable source for power of the various components of the computing system 80, such as line power and/or a battery source. The network interface 92 may include one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

Figure 4:
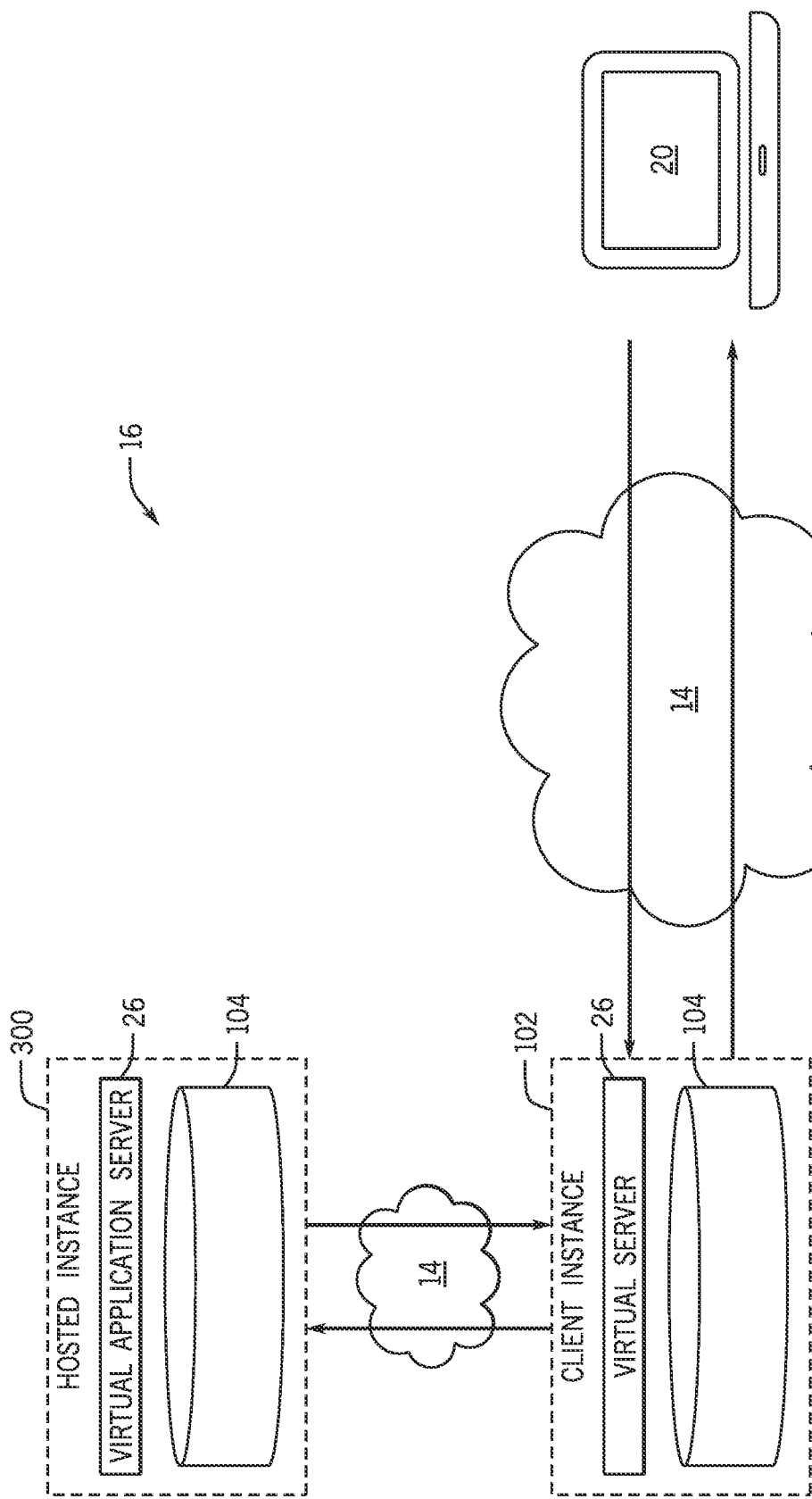
FIG. 4 is a block diagram illustrating an embodiment in which a virtual server supports and enables the client instance, in accordance with aspects of the present disclosure.

With the preceding in mind, FIG. 4 is a block diagram illustrating an embodiment in which a hosted instance 300 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20D via the network 14 to provide a user interface to network applications executing within the client instance 102 (e.g., via a portal on the client device 20D). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device 20D, concurrently, wherein each end-user device is in communication with the single client instance 102. Also, cloud provider infrastructures may be configured to support any number of client instances, such as client instance 102, concurrently, with each of the instances in communication with one or more end-user devices. As such, single or multiple client instances 102 or the hosted instance 300 may execute the server script to provide a customized response for each of the client devices using the portal and receive relevant contextual information about the portal usage.

Figure 5:
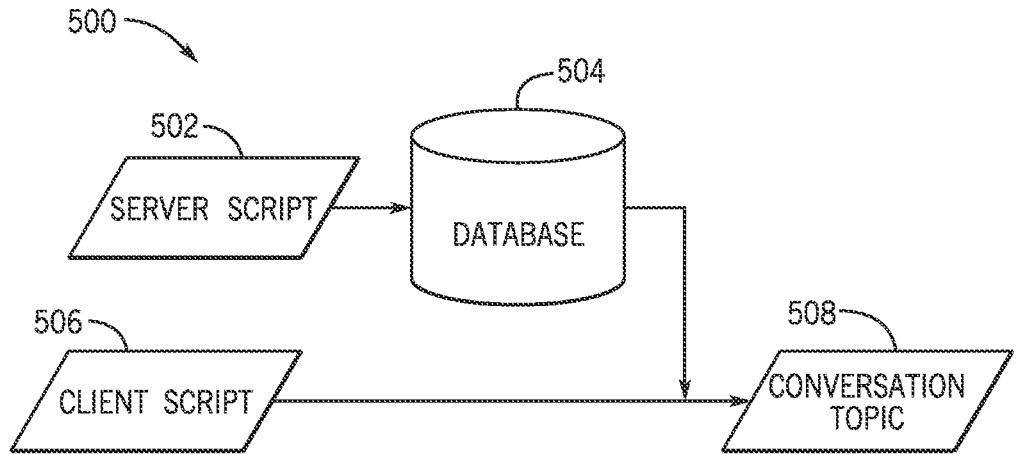
FIG. 5 is a flow diagram of a client script and a server script used to determine a conversation topic, in accordance with aspects of the present disclosure.

With the preceding in mind, FIG. 5 is a flow diagram 500 depicting use of a server script 502 and a client script 506 to determine a conversation topic that may be subsequently used to direct a client-agent conversation to an appropriate agent, in accordance with aspects of the present disclosure. In the depicted embodiment, server script 502 and client script 506 may be code or a set of instructions that automate execution of tasks, such as client request on the portal (e.g., request for a particular functionality on a web browser). The portal may provide a user interface to applications of the network hosting the platform 16. By way of example, for client requests in the portal, such as a request for a particular portal page (e.g., webpage), the script may be instructions for the server (e.g., virtual server 26 of FIG. 2) to provide the requested portal page or instructions for the client device 20 to update the present page based on client input. More specifically, the server script 502 is executed on a physical or virtual server and/or database in the provider environment (e.g., server side scripting) while the client script 506 is executed locally on the portal running on the client device 20 in the client environment (e.g., client side scripting). The server script 502 may be executed directly on a server to generate custom and dynamic pages to fulfill a client's request and then send the pages to the portal. Moreover, the provider environment may create a path from the client's portal to the database 504 (e.g., virtual database server 104 of FIG. 2), such as to store portal usage data to the database 504. Since both the server 26 and the database 504 are in the provider environment, the generated response for the client may be based on client data stored on the server 26 and/or database 504. For example, the stored client data may indicate the client's access rights, custom portal settings, etc. As the client navigates along the portal, the server 26 may track and store data related to portal usage using the server script 502 to the database 504.

On the other hand, the client script 506 may be executed on the client's device and since the client device 20 may include the client script 506 or may be attached to the portal running on the client device 20, the portal may be directly altered in response to the client's inputs (e.g., does not send a page request to the server). Specifically, each time the client script 506 is enabled, such as to respond with a particular function provided by the client script 506, the response data may be communicated to the server (e.g., server 26) in the provider environment via the network 14 or by tracking the changes in the portal. By way of example, the client script 506 may be used for page navigation, such as to provide clickable features, format, and data validation. Thus, the number of mouse clicks for an enabled button on the portal may be tracked and communicated to the server.

Figure 6:
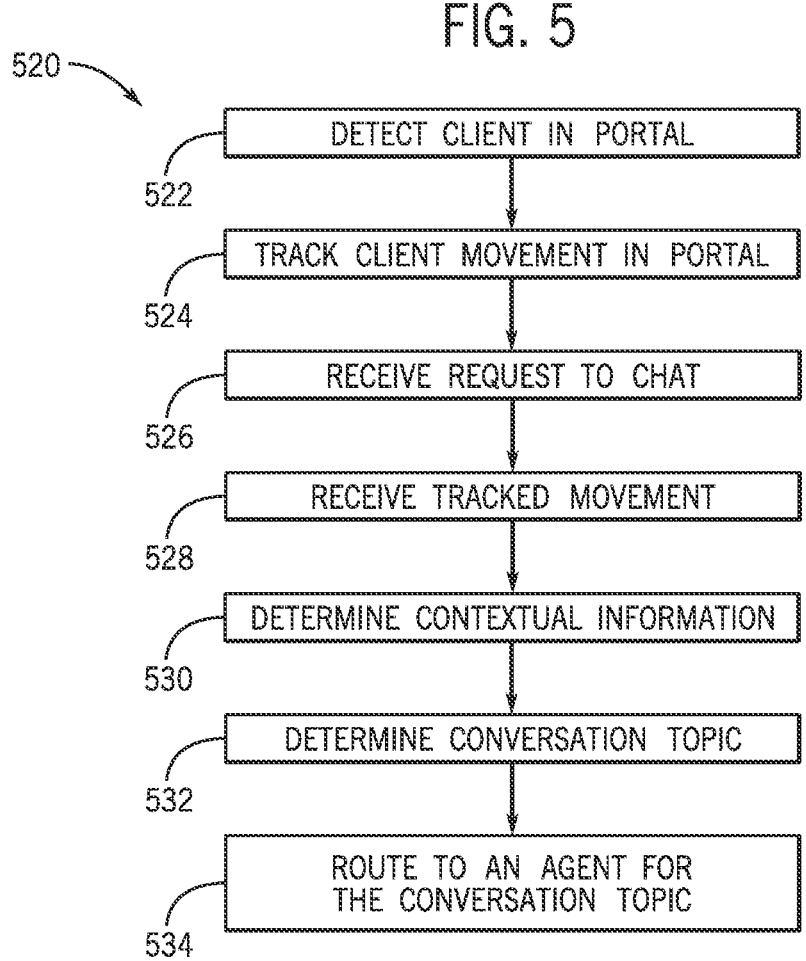
FIG. 6 is a process flow diagram of a process for routing a conversation to an appropriate agent using the client script of FIG. 5, in accordance with aspects of the present disclosure.
Figure 7:
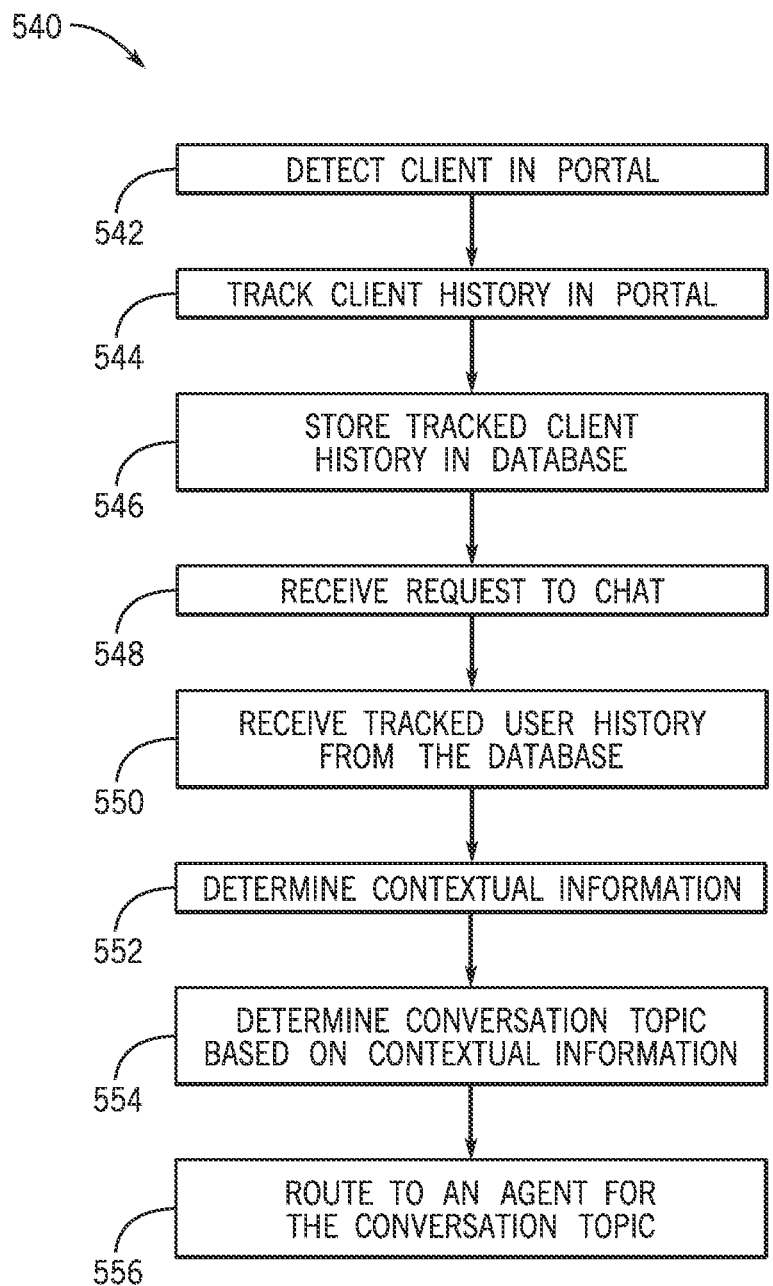
FIG. 7 is a process flow diagram of a process for routing a conversation to an appropriate agent using the server script of FIG. 5, in accordance with aspects of the present disclosure.
Figure 8:
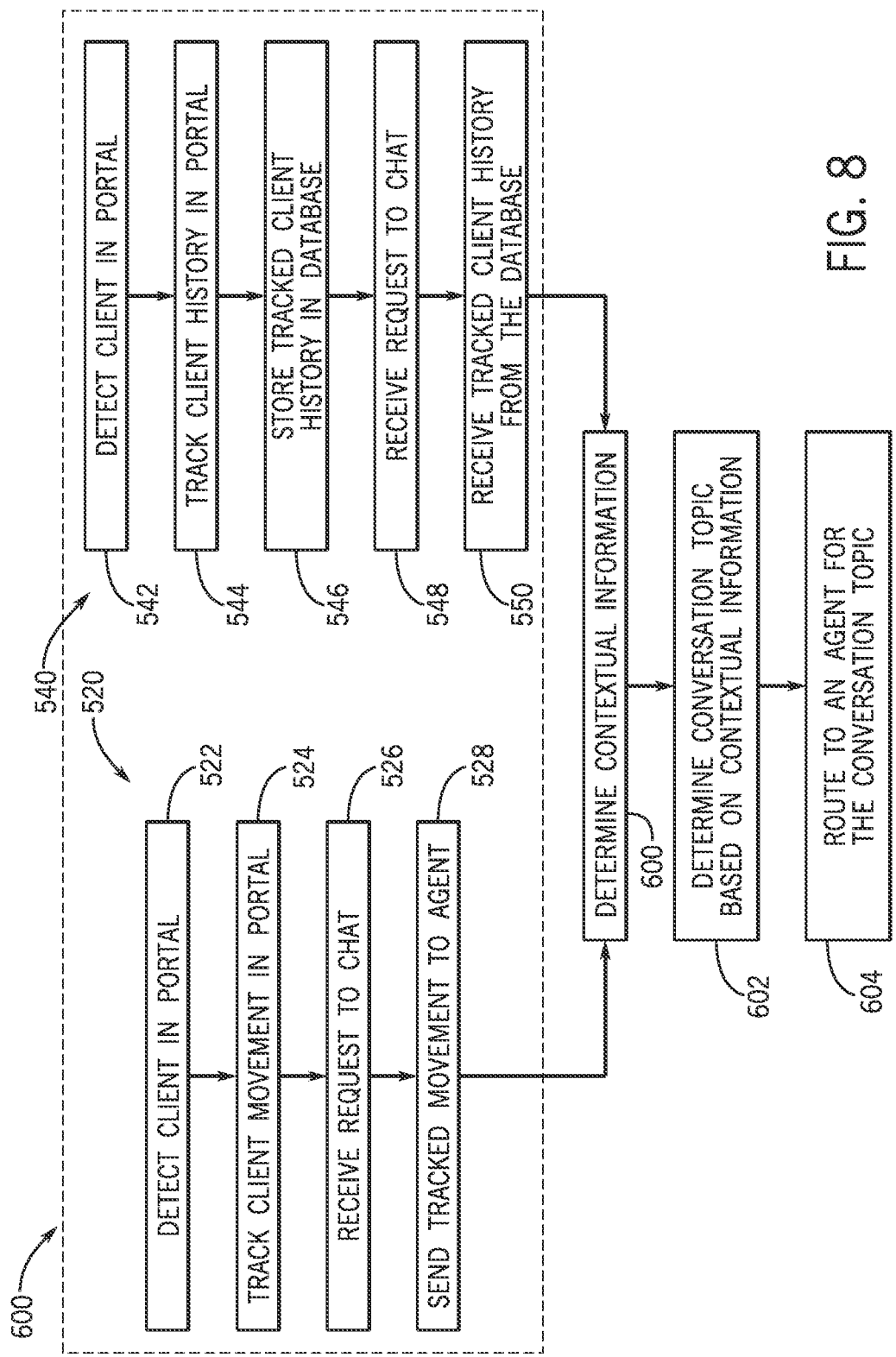
FIG. 8 is a process flow diagram of a process for routing a conversation to an appropriate agent using both the client script of FIG. 6 and the server script of FIG. 7, in accordance with aspects of the present disclosure.

In some embodiments, the server script 502 and/or the client script 506 data, and as discussed in detail in FIGS. 6-8, may be used for routing a conversation topic 508 for a chat request. In particular, the database 504 may be queried for data related to the server script 502, the client's specific portal settings, etc. to determine a conversation topic. Data associated with the client script 506 that indicates the client's movement (e.g., page presently viewed or pages clicked through client journey in the portal) may also be used to determine conversation topic. In some implementations, certain data may be prioritized when making conversation topic determinations. For example, the provider and/or client may set certain data to be more relevant than others or be associated with varying weights (e.g., time spent viewing a page is most relevant). Moreover, these preferential settings may be unique for each client portal based on client settings (e.g., stored in database 104). Thus, the data associated with the server script 502 and/or client script 506 may be used to leverage specific context for client portals.

Often, a client browsing the portal may view documents and pages in search of particular information. By way of example, the client may search for keywords or information relating to a particular router manufactured by the provider. However, after viewing multiple pages or links in the portal, the client may request to chat with an agent for assistance. In such instances, rather than starting the conversation with a general agent (e.g., not specialized) without context related to the client's search in portal prior to the chat request, linking the client with the appropriate agent may facilitate a more efficient and productive conversation.

Accordingly, FIG. 6 illustrates a process 520 for routing a chat request to the appropriate agent for a particular conversation topic based on the client script 506. While the process 520, and other processes described herein (e.g., process 540 of FIG. 7 and process 600 of FIG. 8) is described according to a certain sequence, it should be understood that the present disclosure contemplates that the described steps may be performed in different sequences than the sequence illustrated, and certain described steps may be skipped or not performed altogether. In other embodiments, the process 520 may be implemented at least in part by executing instructions stored in a tangible, non-transitory, computer-readable medium, such as the memory 86, using processing circuitry, such as the processor 82. Additionally or alternatively, the process 520 may be implemented at least in part by circuit connections and/or control logic implemented in a cloud computing system 80. In some implementations, the process 520 may be implemented by the server 26 of FIG. 2, which may be associated with an underlying hardware implementation that includes a memory 86 and processor 82.

As shown, the process 600 may include detecting (block 522) a client using the portal on the client device 20. As previously mentioned, the portal may provide a user interface to applications and features provided in the network hosting the platform 16. By way of example, the portal may include a web browser interface on the client device 20. As such, the web browser may run the client script 506 installed or executed on the client device 20 to change the web browser pages according to inputs on the web browser.

Moreover, the client script 506 may enable functionalities in the portal, and since the portal is an interface to the provider's platform 16, the provider environment may track each functionality enablement or response. Thus, the process 520 may include tracking (block 524) the client movement in the portal. Tracking the client movement may include, for example, pages (e.g., catalogues, technical specifications, articles, blogs) the client clicks on to view, how long the client may spend viewing such pages, where a client's mouse is located during the viewing, etc. To summarize, the tracked data associated with the client script 506 may include local information pertaining to the portal and client device 20.

After navigating through different pages in the portal, the client may request to chat with an agent for additional information, for example, for information the client was unable to find or that may be unavailable in the portal. Thus, the process 520 may include receiving a request (block 526) to chat. A request for chatting may request the network hosting platform 16 to locate an agent (e.g., virtual or non-virtual) for the client. Often, the chat may initiate preliminary questions (e.g., what can I help you with today?). However, these preliminary questions may be answered by viewing the client's movement through the portal prior to the chat request.

To facilitate a contextual chat that may quickly resolve the client's reasoning for requesting the chat, the process 520 may include receiving (block 528) the tracked movement. The tracked movement may provide relevant content, such as data related to the pages viewed, how many times the pages were viewed, etc. Using this data, the process 520 may determine (block 530) contextual information to direct the conversation to the appropriate IT group or agent and/or to facilitate a shorter conversation by automating answers for questions that may otherwise be asked.

Based on the contextual information, the process 520 may determine (block 532) a conversation topic. Continuing with the example of the client searching for information related to the particular router manufactured by the provider, the tracked movement may indicate relevant router portal pages selected throughout the client's journey prior to the request. Thus, using this data associated with the client script 506, the topic of conversation may be easily determined. For example, the pages may be related to a particular router, a family of routers and/or model type, etc. and thus, the conversation topic may be determined as a particular model of a particular router.

After determining the conversation topic, the process 520 may include routing (block 534) the conversation to an agent for the particular conversation topic. In this manner, the client may not be routed to a general agent or irrelevant IT group. By routing to the most appropriate agent by using the client script 506 data, the client may save time that may otherwise be spent answering the preliminary questions to get started and/or being rerouted between different departments. In addition to selecting the appropriate agent, the agent may be provided with the client's tracked history.

In some implementations, such as when data associated with the client script 506 is unavailable or if additional data may provide a better context for routing the conversation, server script 502 data may be utilized. As illustrated in FIG. 7, a chat may be routed to an agent for a particular conversation topic using the server script 502. In the depicted example, the process 540 may include detecting (block 542) a client using the portal on the client device 20. As previously mentioned, server side scripting may occur when the client initiates a server 26 request, such as for the portal to provide a particular functionality. This request may be in response to a functionality that client side scripting may not provide. For example, the client script 506 does not have access to databases in the provider's environment (e.g., virtual database server 104 of FIG. 2). Thus, portal functionality or requirements that may involve data or processing in the provider environment, such as by using server 26 (e.g., virtual server 26 of FIG. 2) and/or database 104, may be provided by server side scripting. Other examples may include providing dynamic portal pages, which may be generated by the server script 502.

Moreover, since the portal is connected to the server 26, the functionalities provided by the server script 502 that is executed on the server 26 may be tracked and stored on server 26 and/or database 104. Thus, the process 540 may include tracking (block 544) the client history in the portal. Rather than tracking number of clicks on a particular portal page, as provided by the client script 506 data, the server script 502 data may allow tracking the particular portal the client is using (e.g., a portal with specific functionalities unique to the particular client), portal pages the client has viewed over time and prior to requesting a chat, documents downloaded during the session, etc. Thus, server side scripting may provide data that may not otherwise be available by the client script 506 and this data may be stored (block 546) in database 104.

Next, the process 540 may include receiving a request (block 548) to chat. Continuing with the example of the client searching for information relating to the particular router manufactured by the provider, as discussed in FIGS. 5 and 6, the tracked movement may indicate server 26 requests based on the server script 502, such as technical documents relating to the router that may be downloaded and are accessible by the server 26. However, the client may not find the information of interested, and thus, the client may request chatting with an agent for more information.

To provide context for the client's reasoning for requesting a chat, the process 540 may include receiving (block 550) tracked user history from the database 104. In particular, information related to requests processed using the server script 502 and/or information related to the client may be tracked. The data may indicate the client's interest in the particular router and indicate activity that may be more contextually useful than other information, such as configuration manuals (e.g., technical documents) that were downloaded related to the router.

Thus, the process 540 may include determining (block 552) contextual information using the server script 502 data. Specifically, the server script 502 data may indicate the particular topic of interest to the client. Using the contextual information, the process may include determining (block 554) conversation topic. For example, the topic may be related to router hardware, and more specifically, configuring routers. Thus, a specific conversation topic may be determined for the reasoning behind a client's request for chatting. Accordingly, the process 540 may include routing (block 556) to an agent for the conversation topic of configuring a router.

However, in some instances, although the client downloaded a particular document, which may be indicated using the server script 502, the client may have also clicked on a particular portal page multiple times, which may be indicated by the client script 506. In some instances, the fact that the client visited a portal page often or spent a long time viewing the page, may be more indicative contextual information. Similarly, although a client may have spent an extended time period viewing a particular page, which may be determined using the client script 506, the client may also have downloaded multiple related documents of interest, which may be indicated by the server script 502. For example, the client may have spent a long time on the particular page because they requested the portal page and then left the client device 20 idle. Thus, the client script 506 may indicate a long duration spent on a particular page but that data may not be the most accurate context. Accordingly, in some instances, both the server script 502 and client script 506 data may be combined to provide precise contextual information.

To illustrate, FIG. 8 depicts a process 600 for routing a conversation to the appropriate agent using both the server script 502 and client script 506. As depicted, portions of process 520 of FIG. 6 and process 540 of FIG. 7 may be combined to determine contextual information, which may then be used to determine conversation topic and routing the conversation to the appropriate agent. In particular, process blocks 522, 524, 526, and 528 may be implemented as discussed with respect to FIG. 6, and process blocks 542, 544, 546, 548, and 550 may be implemented as discussed with respect to FIG. 7, as indicated by the dashed box. In the current embodiment, these processes may be implemented individually and up to the point of receiving tracked client data using the respective scripts 502 and 506.

After receiving tracked client data from the server side using server script 502 and the client side using client script 506, the process 600 may include determining (block 602) contextual information. For example, a combination of server side and client side tracked data may provide a more detailed insight into the client's movement. For example, the combined data may indicate information related to clicks on the portal pages, time spent on particular pages, client settings for the portal, documents downloaded from the portal, etc. Thus any false positives or less relevant data indicated from any one script (e.g., client script 506) may be overcome by the other script (e.g., server script 502). In this manner, determining relevant information in the context of all the data may be easier and contextual information may be more accurate.

Next, the process 600 may include determining (block 602) conversation topic based on the contextual information. Since the relevant information may be more narrowly focused, the conversation topic may be more precisely determined. Continuing with the example of the client viewing router information in the portal of FIGS. 5-7, determining an accurate conversation topic may be possible. While neither server script 502 nor client script 506 may indicate a narrow topic of conversation, using a combination of both may indicate the client's interest in information related to a particular software configuration for the particular router model manufactured by the provider.

Upon determining the conversation topic, the process 600 may include routing (block 604) to an agent for the conversation topic. Since a particular conversation topic is determined, routing to the most appropriate or relevant agent may be possible. For example, routing using the client script 506 may route to an agent for router hardware while routing using the server script 502 may route to an agent for software configurations. Although these conversation topics may be relevant, and thus, the client may still skip answering preliminary chat questions, using both server script 502 and client script 506 may provide a more accurate and precise indication for the conversation topic, and thus, the corresponding agent. In general, a set of rules may be used to route to an agent. For example, if a particular topic has been searched, then route to agent A, while if a different topic has been searched in conjunction with documents downloaded relating to another topic, then route to agent B, etc. Moreover, the set of rules for routing may be customized for the specific client portal.

As briefly mentioned above, a client may benefit from precise conversation topic determinations since initial chat questions may be automatically populated using the contextual information. More specifically, and particularly for virtual agents, conversation questions and answers may be based on a decision tree design. For example, the agent may ask an initial question (e.g., root of the tree) and from there, additional information may be asked to facilitate the conversation (e.g., move down tree branches) to provide the client with the information for which the request for chat was received. Thus, there may be a series of questions that may be automatically fulfilled using the contextual information determined using the techniques described herein. As such, the virtual agent may jump from tree branches of the tree questionnaire. Similarly, in a non-virtual environment, the chat may be directed to the most appropriate IT group or live agent for the topic.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method comprising:
    tracking one or more movements performed relative to a client interface in a web portal, the one or more movements indicative of contextual information and corresponding to interactions performed by a user in the web portal prior to starting a client-agent chat;
    receiving a chat request to initiate the client-agent chat from the client interface after tracking the one or more movements in the web portal;
    in response to the chat request, determining a conversation topic based at least in part on the contextual information derived from tracking the one or more movements, wherein at least one movement of the one or more movements is prioritized over a second movement of the one or more movements for determining the conversation topic for the client-agent chat;
    automatically populating the client-agent chat with the contextual information based at least in part on the conversation topic by jumping from a first branch of a decision tree algorithm to a second branch of the decision tree algorithm in response to the first branch being automatically populated based on the contextual information, based on populating at least one of a root node or a leaf node of the decision tree algorithm with the contextual information, or based on a combination thereof; and
    routing the client-agent chat to an agent assigned to handle chat requests related to the conversation topic, wherein the agent can initiate the client-agent chat at a point sequentially after one or more initial steps that were automatically populated with the contextual information based on the decision tree algorithm.

2. The method of claim 1, wherein the one or more movements are associated with a server script associated with a provider environment hosting a client instance associated with the client interface.

3. The method of claim 2, wherein the one or more movements associated with the server script comprise a change executed in a server associated with the provider environment in response to a request made via the client interface.

4. The method of claim 2, wherein the server script comprises a code executed by a server in response to a request made via the client interface.

5. The method of claim 4, wherein the request is for dynamic pages for display on the client interface.

6. The method of claim 1, wherein the one or more movements are associated with a client script associated with the client interface.

7. The method of claim 6, wherein the one or more movements associated with the client script comprise a number of button clicks.

8. The method of claim 6, wherein the interactions comprise particular pages viewed, time spent viewing the particular pages, or both, in the web portal.

9. The method of claim 6, wherein the one or more movements associated with the client script comprise location activity associated with the client interface.

10. The method of claim 1, comprising:
sending a history of the one or more movements to provide additional context to the agent upon routing the client-agent chat to the agent.

11. The method of claim 1, wherein the at least one movement of the one or more movements is prioritized over the second movement of the one or more movements based on one or more weights associated with the at least one movement and the second movement, wherein the one or more weights correspond to a degree of relevance for determining the conversation topic.

12. A system, comprising:
a memory configured to store instructions; and
a processor configured to execute the stored instructions, causing the processor to:
track one or more movements performed relative to a client interface in a web portal, the one or more movements indicative of contextual information and corresponding to interactions performed by a user in the web portal prior to starting a client-agent chat;
receive a chat request to initiate the client-agent chat from the client interface after tracking the one or more movements in the web portal;
in response to receiving the chat request, automatically populate the client-agent chat based at least in part on the contextual information derived from tracking the one or more movements by jumping from a first branch of a decision tree algorithm to a second branch of the decision tree algorithm in response to the first branch being automatically populated with the contextual information, based on populating at least one of a root node or a leaf node of the decision tree algorithm with the contextual information, or based on a combination thereof, wherein at least one movement of the one or more movements is prioritized over a second movement of the one or more movements for determining the contextual information; and
route the client-agent chat to a particular agent of a plurality of agents based at least in part on the contextual information, wherein the particular agent can initiate the client-agent chat at a point sequentially after one or more initial steps that were automatically populated with the contextual information based on the decision tree algorithm.

13. The system of claim 12, wherein the contextual information is indicative of a particular conversation topic of a plurality of conversation topics.

14. The system of claim 12, wherein the particular agent is a virtual agent or a live agent.

15. The system of claim 12, wherein the one or more movements are tracked in a client script associated with the client interface, a server script associated with a provider environment hosting the client interface, or both.

16. The system of claim 15, wherein the processor is configured to:
request the server script in response to unavailability of the client script.

17. The system of claim 15, wherein the server script provides an indication of particular functionalities of the web portal associated with the client interface, wherein the particular functionalities are unique to a client instance.

18. The system of claim 12, wherein the at least one movement of the one or more movements is prioritized over the second movement of the one or more movements based on one or more weights associated with the at least one movement and the second movement, wherein the one or more weights correspond to a degree of relevance for determining the contextual information.

19. A non-transitory computer-readable storage medium storing executable instructions that, when executed by a processor, cause operations to be performed comprising:
tracking one or more movements performed relative to a client interface in a web portal, the one or more movements indicative of contextual information and corresponding to interactions performed by a user in the web portal prior to starting a client-agent chat;
receiving a chat request to initiate the client-agent chat from the client interface after tracking the one or more movements in the web portal;
in response to the chat request, determining a conversation topic based at least in part on the contextual information derived from tracking the one or more movements, wherein at least one movement of the one or more movements is prioritized over a second movement of the one or more movements for determining the conversation topic for the client-agent chat;
automatically populating the client-agent chat with the contextual information based at least in part on the conversation topic by jumping from a first branch of a decision tree algorithm to a second branch of the decision tree algorithm in response to the first branch being automatically populated with the contextual information, based on populating at least one of a root node or a leaf node of the decision tree algorithm with the contextual, or based on a combination thereof; and
routing the client-agent chat to an agent assigned to handle chat requests related to the conversation topic, wherein the agent can initiate the client-agent chat at a point sequentially after one or more initial steps that were automatically populated with the contextual information based on the decision tree algorithm.

20. The non-transitory computer-readable storage medium of claim 19, wherein the one or more movements are tracked using a client script, the client script comprising data indicating one or more pages clicked in the client interface, time spent on the one or more pages, a location of an input device associated with the client interface, or any combination thereof.

* * * * *